United States Patent [19]

Yates, III et al.

[11] Patent Number: 4,619,971
[45] Date of Patent: Oct. 28, 1986

[54] LINEAR POLYESTER RESIN BLENDS WITH HIGH IMPACT RESISTANCE

[75] Inventors: John B. Yates, III; Timothy J. Ullman, both of Clifton Park, N.Y.

[73] Assignee: General Electric Company, Schenectady, N.Y.

[21] Appl. No.: 717,938

[22] Filed: Mar. 29, 1985

[51] Int. Cl.$^4$ .............................................. C08L 67/02
[52] U.S. Cl. ..................................... 525/166; 525/64; 525/92; 525/175
[58] Field of Search .................... 525/64, 92, 166, 175

[56] References Cited

U.S. PATENT DOCUMENTS

| | | |
|---|---|---|
| 3,435,093 | 3/1960 | Cope . |
| 4,013,613 | 3/1977 | Abolins et al. . |
| 4,080,354 | 3/1984 | Kramer . |
| 4,117,034 | 9/1978 | Steffancin ............................ 525/64 |
| 4,119,607 | 10/1978 | Gergen ................................ 525/93 |
| 4,172,859 | 10/1979 | Epstein ............................... 525/109 |
| 4,260,690 | 4/1981 | Binsak et al. . |
| 4,263,409 | 4/1981 | Liberti . |
| 4,292,233 | 9/1981 | Binsack et al. . |
| 4,342,846 | 8/1982 | Silberberg ............................. 525/64 |
| 4,346,195 | 8/1982 | Hornbaker et al. . |
| 4,373,067 | 2/1983 | Dieck ................................. 525/146 |
| 4,476,274 | 10/1984 | Liu . |
| 4,485,212 | 11/1984 | Wefer .................................. 525/64 |
| 4,493,921 | 1/1985 | Wefer . |

*Primary Examiner*—John C. Bleutge
*Assistant Examiner*—Patricia A. Short
*Attorney, Agent, or Firm*—William H. Pittman; James C. Davis, Jr.; James Magee, Jr.

[57] ABSTRACT

Resinous compositions comprising blends of linear polyesters such as poly(butylene terephthalate) with nitrile rubbers have very high impact strengths. The blends may also contain other polymers such as elastomers free from nitrile structural units, addition polymers of olefins or chlorinated olefins, or polylactones; such other polymers frequently improve properties such as gloss and low temperature impact strength.

5 Claims, No Drawings

LINEAR POLYESTER RESIN BLENDS WITH HIGH IMPACT RESISTANCE

This invention relates to polyester-containing resin blends having improved impact properties, and more particularly to blends containing specific ratios of nitrile elastomers.

Linear polyesters such as poly(ethylene terephthalate) and poly(butylene terephthalate) are in wide use as engineering resins because of their high solvent resistance, thermal and dimensional stability and low moisture absorption. In order to produce molded polyester articles of high impact resistance, however, it has been necessary to blend the polyesters with other resins having good impact properties, such as polycarbonates.

The blends thus obtained are themselves deficient in certain applications. For example, polyester-polycarbonate blends have excellent impact properties at ambient temperatures but their impact resistance decreases substantially at lower temperatures. Moreover, such blends tend to undergo ester-carbonate interchange which results in degradation and randomization of the polymer chains, with a resulting deleterious effect on physical properties.

A principal object of the present invention, therefore, is to produce improved linear polyester-based resin blends.

A further object is to improve the impact properties of linear polyesters over a wide temperature range.

Other objects will in part be obvious and will in part appear hereinafter.

In its broadest aspect, the present invention includes resinous compositions comprising (A) at least one substantially linear polyester and (B) a nitrile-containing component selected from the group consisting of:

elastomeric copolymers containing nitrile structural units in an amount to provide from 6% to about 10% by weight of said units in said resinous composition, and blends of (B-1) at least one elastomeric copolymer containing nitrile structural units with (B-2) at least one other polymer selected from the group consisting of elastomeric addition polymers free from nitrile structural units, addition polymers of olefins or chlorinated olefins, and polylactones, said blend containing nitrile structural units in an amount to provide from 1% to about 8% by weight of said units in said resinous composition.

The linear polyesters useful as component A in the compositions of this invention contain structural units of the formula

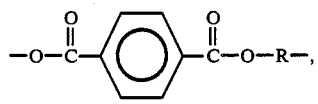

wherein R is a lower alkylene group (that is, an alkylene group containing up to 7 carbon atoms). Illustrative R values are ethylene, propylene, trimethylene, tetramethylene (1,4-butylene), pentamethylene and hexamethylene. Preferably, R is an ethylene or tetramethylene group; i.e., it is derived from ethylene glycol or 1,4-butanediol. In such cases, the linear polyester is poly(ethylene terephthalate) or poly(butylene terephthalate), identified hereinafter as "PET" and "PBT", respectively. Particularly preferred is PBT. The number average molecular weight of the linear polyester is generally in the range of about 20,000–60,000, as calculated from intrinsic viscosity or by quantitative infrared analysis of the hydroxy and carboxy end groups in the polyester.

Component B is at least one elastomeric component characterized by the presence of nitrile groups therein. The nitrile groups are generally in the form of structural addition polymer units derived from acrylonitrile, methacrylonitrile or the like, with acrylonitrile being preferred.

In one embodiment of the invention, component B is a single elastomeric copolymer containing nitrile units. Commercially available copolymers of this type are generically designated "nitrile rubbers". They are generally copolymers of acrylonitrile with at least one conjugated diene such as butadiene, isoprene, chloroprene and 1,3-hexadiene, and may also contain structural units derived from acidic monomers such as acrylic acid or methacrylic acid. They typically contain about 20–50% (by weight) nitrile structural units and optionally about 2–10% acidic structural units, and have Mooney viscosities in the range of about 25–150 at 100° C.

Various acrylonitrile-butadiene rubbers suitable for use in the invention are available from Polysar Ltd. under the tradename KRYNAC. The following grades are illustrative; all percentages are by weight and are approximate.

| Grade | Acrylonitrile units, % | Acrylic acid units, % | Mooney visc., 100° C. |
|---|---|---|---|
| 19.65 | 19 | 0 | 65 |
| 25.65 | 25 | 0 | 65 |
| 34.50 | 34 | 0 | 50 |
| 50.75 | 50 | 0 | 75 |
| 211 | 34 | 8 | — |
| 1122* | 34 | 8 | — |

*Contains 10% polyvinyl chloride

The proportion of nitrile structural units in the composition is an important feature of the invention. When component B is a single elastomeric copolymer containing nitrile structural units, said structural units should comprise at least 6% of the combination of components A and B, since attainment of the desired high impact strength on a consistent basis requires a nitrile level at least that high. An upper level of about 10% is appropriate since there is rarely any substantial advantage gained by the presence of a larger proportion of nitrile units.

In a second embodiment of the invention, component B is a blend of (B-1) at least one nitrile rubber or similar elastomeric polymer, such as the ones described hereinabove, with (B-2) at least one other polymer. Component B-2 may be of various types.

The first type consists of elastomeric addition polymers free from nitrile structural units. These include homopolymers and copolymers of the aforementioned conjugated dienes. Suitable homopolymers are illustrated by cis-butadiene rubbers having Mooney viscosities at 100° C. in the range of about 30–75. The copolymers may contain monomeric units such as styrene, acrylic acid, methacrylic acid, maleic anhydride, ethyl acrylate, glycidyl methacrylate, acrylamide or vinyl alcohol units. Sulfonated and phosphonated elastomers and the like may also be used. Included are styrene-diene graft and block copolymers, including partially hydrogenated block copolymers.

Also useful are elastomeric copolymers of non-conjugated dienes such as 1,4-hexadiene, 1,5-heptadiene, 1,6-octadiene, 1,4-cyclohexadiene, dicyclopentadiene, 5-methylene-2-norbornene and 5-ethylidene-2-norbornene. These include the "EPDM" elastomers containing ethylene, propylene and non-conjugated diene units.

A second type of other polymers suitable as component B-2 consists of addition polymers of olefins and of chlorinated olefins. Suitable olefins and chlorinated olefins include ethylene, propylene and vinyl chloride. The olefin polymers are generally copolymers, including ethylene-propylene copolymers and those containing acid or ester structural units derived from acrylic acid, ethyl acrylate, vinyl acetate or the like, most often in the amount of about 5–25% by weight.

A third type of other polymers is the polylactones, typically derived from lactones containing about 1–18 and especially about 5–10 carbon atoms. Polycaprolactone is particularly preferred. It is frequently found that compositions in which component B includes an olefin polymer or a polylactone have an attractive appearance because of high surface gloss.

As a general rule, the percentage of nitrile units in the composition need not be as high when component B-2 is present as when it is absent. Nitrile percentages as low as 1% are then suitable, and levels higher than about 8% are seldom necessary or appropriate. When the nitrile proportion is at least 2%, the composition generally has improved low-temperature impact strength.

The compositions of this invention may also contain non-resinous materials. For example, the addition of antimony trioxide may under certain conditions improve the strand strength of the composition upon extrusion. Various known fillers may be incorporated therein, typically in amounts up to about 25 parts per 100 parts of resin, with a particular preference being expressed for glass fibers since they often impart high modulus and tensile strength at both high and low temperatures. It is believed that a chemical coupling effect of some kind takes place between the resinous composition and the surface of the glass fiber, although the invention is not dependent on the presence or absence of such effect.

The resinous compositions of this invention may be prepared by known blending methods, including dry blending, melt blending (as by extrusion) and solution blending. They are particularly useful for the preparation of molded articles by known molding techniques, particularly injection molding. The articles thus produced are another aspect of the invention. For the most part, they are characterized by extremely high impact strengths, represented by notched Izod values typically in excess of 795 joules/m. (15 ft.lbs./in.). In many instances, the molded test strips do not break but merely bend during the test procedure.

The invention is illustrated by the following examples. All parts and percentages are by weight.

EXAMPLES 1–8

Component A was a poly(butylene terephthalate) having a number average molecular weight of about 45,000, and component B was a KRYNAC nitrile rubber. In Example 8, glass fibers were also present in the amount of 43 parts per 100 parts of resin.

The blend components were tumble mixed in a jar mill for 30 minutes and extruded at 210°–290° C. in a twin screw extruder at a screw speed of 150 rpm. In Examples 6–7, the blend was extruded twice. The extruded material was quenched in water, pelletized and dried in a vacuum oven at 100° C. Izod test bars were then injection molded at 210°–290° C. and impact strengths were determined at room temperature.

The relevant compositional data and test results are given in Table I. The designation NB means that the test bar bent but did not break.

TABLE I

| Example | Component A, parts | Component B Grade | Component B Parts | Nitrile in blend, % | Impact strength Ft.-lb./in. | Impact strength Joules/m. |
|---|---|---|---|---|---|---|
| 1 | 75 | 25.65 | 25 | 6.25 | 18.5 NB | 980.5 |
| 2 | 78 | 211 | 22 | 7.48 | >18 NB | >955 |
| 3 | 75 | 34.50 | 25 | 8.5 | 17 NB | 901 |
| 4 | 75 | 211 | 25 | 8.5 | 20 NB | 1060 |
| 5 | 65 | 25.65 | 35 | 8.75 | 20 NB | 1060 |
| 6 | 80 | 211 | 20 | 6.8 | 20 NB | 1060 |
| 7 | 75 | 211 | 25 | 8.5 | 20 NB | 1060 |
| 8 | 79 | 211 | 21 | 7.14 | 10.2 | 540.6 |

EXAMPLES 9–16

Following the procedure of Examples 1–8, blends were made containing the poly(butylene terephthalate) of those examples as component A, KRYNAC 211 or 1122, 0.1 part of antimony trioxide and, as component B-2, either an ethylene-ethyl acrylate copolymer ("ester") containing 18% ethyl acrylate units and having a melt index of 6 grams/10 min., an ethylene-acrylic acid copolymer ("acid") containing 8% acrylic acid and having a melt index of 5.5 grams/10 min., or the polyvinyl chloride constituent of KRYNAC 1122 ("PVC"). The relevant parameters and room temperature impact strengths are given in Table II.

TABLE II

| Example | Component A, parts | Component B-1, parts | Component B-2 Identity | Component B-2 Parts | Nitrile in blend, % | Impact strength Ft.-lbs./in. | Impact strength Joules/m. |
|---|---|---|---|---|---|---|---|
| 9 | 75 | 10 | Ester | 15 | 3.4 | 16 NB | 848 |
| 10 | 80 | 10 | Ester | 10 | 3.4 | 12 NB | 636 |
| 11 | 70 | 15 | Ester | 15 | 5.1 | >18 NB | >954 |
| 12 | 70 | 15 | Acid | 15 | 5.1 | >18 NB | >954 |
| 13 | 75 | 15 | Acid | 10 | 5.1 | >18 NB | >954 |
| 14 | 80 | 15 | Acid | 5 | 5.1 | >18 NB | >954 |
| 15 | 70 | 20 | Ester | 10 | 6.8 | >18 NB | >954 |
| 16 | 85 | 7.5 | PVC | 7.5 | 4.6 | 18 NB | 954 |

EXAMPLES 17–27

Following the procedure of Examples 1–8, blends were made containing the poly(butylene terephthalate) of those examples as component A, KRYNAC 19.65 as component B-1, and a cis-butadiene rubber having a Mooney viscosity at 100° C. within the range of 38–46 as component B-2. The relevant parameters and impact strengths at various temperatures are given in Table III.

TABLE III

| Example | Component A, parts | Component B, parts | Component B-2, parts | Nitrile in blend, % | Impact strength, ft.-lbs./in. (joules/m.) | | |
|---------|---|---|---|---|---|---|---|
| | | | | | Room temp. | −30° C. | −50° C. |
| 17 | 85 | 7.5 | 7.5 | 1.47 | NB | 2(106) | — |
| 18 | 85 | 6 | 9 | 1.18 | NB | 1.7(90.1) | — |
| 19 | 80 | 10 | 10 | 1.97 | NB | 3.5(185.5) | — |
| 20 | 80 | 8 | 12 | 1.57 | NB | 2.5(132.5) | — |
| 21 | 80 | 6 | 14 | 1.18 | NB | 2(106) | — |
| 22 | 75 | 17.5 | 7.5 | 3.44 | NB | >16(>848) | — |
| 23 | 75 | 12.5 | 12.5 | 2.46 | NB | >16(>848) | 8(424) |
| 24 | 75 | 10 | 15 | 1.97 | NB | 4(212) | — |
| 25 | 75 | 7.5 | 17.5 | 1.47 | NB | 5(263) | — |
| 26 | 65 | 24.5 | 10.5 | 4.81 | NB | >16(>848) | 13(689) |
| 27 | 65 | 17.5 | 17.5 | 3.44 | NB | >16(>848) | >16(>848) |

EXAMPLES 28–32

Following the procedure of Example 1–8, blends were made containing the poly(butylene terephthalate) of those examples as component A, and a KRYNAC nitrile rubber as component B-1, and, as component B-2, an EPDM rubber ("EPDM") containing 75% by weight ethylene units and having a Mooney viscosity of 50 at 127° C., commercially available from Exxon Corporation as "VISTALON 719", or a polycaprolactone ("lactone") having a weight average molecular weight of about 40,000, commercially available from Union Carbide as "TONE 700". The relevant parameters and impact strengths at room temperature are given in Table IV.

TABLE IV

| Example | Component A, parts | Component B-1 Grade | Component B-1 Parts | Component B-2 Identity | Component B-2 Parts | Nitrile in blend, % | Impact strength Ft.-lb./in. | Impact strength Joules/m. |
|---|---|---|---|---|---|---|---|---|
| 28 | 70 | 211 | 15 | EPDM | 15 | 5.1 | NB | |
| 29 | 65 | 211 | 30 | EPDM | 5 | 7.5 | >18 | >954 |
| 30 | 65 | 211 | 15 | EPDM | 20 | 3.75 | 12 | 636 |
| 31 | 75 | 25.65 | 15 | Lactone | 10 | 7.5 | 15 NB | 795 |
| 32 | 80 | 50.75 | 10 | Lactone | 10 | 2.5 | 12.5 NB | 662.5 |

What is claimed is:

1. A resinous composition having a notched Izod impact strength at room temperature in excess of 795 joules/m., wherein the resinous components consist essentialy of:

(A) at least one polyester selected from the group consisting of poly(ethylene terephthtalate) and poly(butylene terephthalate), and
   (B) a blend of:
   (B-1) at least one elastomeric addition copolymer consisting essentially of structural units derived form acrylonitrile and at least one conjugated diene or a combintation of at least one conjugated diene and at least one acidic monomer, and
   (B-2) at least one elastomeric conjugated diene addition homopolymer or copolymer free from nitrile structural units; said blend containing nitrile structural units in an amount to provide from 1% to about 8% by weight of said units in said resinous composition.

2. A composition according to claim 1 wherein component A is a poly(butylene terephthalate) having a number average molecular weight in the range of about 20,000–60,000.

3. A composition according to claim 2 wherein component B-1 contains about 20–50% nitrile structural units by weight and has a Mooney viscosity in the range of about 25–150 at 100° C.

4. A composition according to claim 3 wherein component B-1 also contains about 2–10% of acrylic acod structural units.

5. A composition according to claim 1 wherein the conjugated diene is butadiene.

* * * * *